United States Patent [19]

Fryer

[11] Patent Number: 4,611,336
[45] Date of Patent: Sep. 9, 1986

[54] FRAME SYNCHRONIZATION FOR DISTRIBUTED FRAMING PATTERN IN ELECTRONIC COMMUNICATION SYSTEMS

[75] Inventor: Warren R. Fryer, New York, N.Y.

[73] Assignee: Calculagraph Company, East Hanover, N.J.

[21] Appl. No.: 672,850

[22] Filed: Nov. 19, 1984

Related U.S. Application Data

[63] Continuation-in-part of Ser. No. 582,077, Feb. 21, 1984, abandoned.

[51] Int. Cl.$^4$ ............................ H04L 7/08; H04J 3/06
[52] U.S. Cl. .................... 375/111; 375/112; 375/116; 370/105
[58] Field of Search .............. 375/111, 112, 114, 116; 370/105, 106; 328/63, 75

[56] References Cited

U.S. PATENT DOCUMENTS

| | | | |
|---|---|---|---|
| 3,597,539 | 8/1971 | Clark | 375/114 |
| 3,621,140 | 11/1971 | Griffiths | 375/119 |
| 3,842,399 | 10/1974 | Kneuer et al. | 371/69 |
| 3,854,011 | 12/1974 | Mallory et al. | 370/105 |
| 3,883,729 | 5/1975 | de Cremiers | 375/116 |
| 3,903,371 | 9/1975 | Colton et al. | 375/116 |
| 4,002,845 | 1/1977 | Kaul et al. | 375/106 |
| 4,016,368 | 4/1977 | Apple, Jr. | 375/116 |
| 4,032,885 | 6/1977 | Roth | 375/116 |
| 4,203,003 | 5/1980 | Kline | 375/111 |
| 4,247,945 | 1/1981 | Seibel | 375/114 |
| 4,298,987 | 11/1981 | Stattel et al. | 375/106 |
| 4,347,606 | 8/1982 | Hoogeveen | 375/116 |
| 4,375,102 | 2/1983 | Van Daal | 375/106 |

Primary Examiner—Robert L. Griffin
Assistant Examiner—Raymond C. Glenny
Attorney, Agent, or Firm—Martha G. Pugh

[57] ABSTRACT

Frame bit synchronizer for a framing pattern sequence consisting of M Bits distributed in a serial bit stream as single bits at intervals of a fixed number N, of bits, as measured from the start of one framing bit to the start of the next. The system initially operates in a framing mode, searching for frame, until the framing pattern sequence has been determined, upon which event the operation shifts to an in-frame monitoring mode for detecting errors in the framing pattern sequence in the serial bit stream as received.

5 Claims, 6 Drawing Figures

FRAME SYNCHRONIZATION FOR DISTRIBUTED FRAMING PATTERN IN ELECTRONIC COMMUNICATION SYSTEMS

This application is a continuation-in-part of application Ser. No. 582,077 filed Feb. 21, 1984, now abandoned.

BACKGROUND OF THE INVENTION

This invention relates in general to obtaining synchronization from a serial bit stream of data pulses, more particularly where the synchronization code is distributed as single bits at fixed bit intervals in the bit stream, such as occurs in telecommunications, especially pulse code modulated telephony systems.

Embedded in the bit stream of some digital transmissions systems, particularly those employed in telephony, is a pre-assigned bit pattern that is distributed at intervals containing a fixed number, N, of bits. It is necessary to search the bit stream to discover the starting point of the embedded pattern so that the meaning of the remaining bits in the stream can be established.

In pulse code modulation telephony, bits are organized in frames, each of which represents the sampled status of all signals associated with that transmission. These samples are normally generated at a rate of 8000 per second. Typically, one bit is added to each frame; and that bit is part of the pre-assigned pattern that signals the start of a frame and, when appropriate, the first frame of a sequence to be established.

Frame synchronization is performed by a number of prior art systems; but these systems have been found to have certain disadvantages. For example, some of the prior art systems are restricted to use with only specific types of framing patterns, such as patterns organized exclusively as alternating ones and zeros, and are not adaptable to the synchronization of alternative patterns of data transmission. Other prior art systems, which may not be pattern dependent, frequently require a substantial amount of hardware to perform the frame sycnchronization function.

Short Description of the Invention

It is therefore the principal object of this invention to improve frame synchronization for serial bit streams having an embedded framing pattern. A more particular object of the invention is to provide frame synchronization which is substantially independent of the pattern of the transmitted data.

Another object of the invention is to achieve frame synchronization with economy of hardware for any serial bit stream in which a distributed pre-assigned framing pattern comprises single bits disposed at fixed intervals to signal the start of a frame, or the first frame in a frame sequence.

The theory of the invention can be summarized as follows. Assume that the bit stream to be monitored comprises an M-bit framing pattern sequence which comprises a series of single bits each of which appears every N bits. If a series of N counters is arranged so that each incoming bit relates to one and only one of the counters, when the Nth counter is used, the next incoming bit relates to the first counter used. Thus, the framing bit in each successive N-bit interval will always relate to the same counter.

Which counter has the framing bit can be determined by allowing the count in each counter to represent the position within the framing pattern sequence of the next framing bit at the counter's position in the N-bit interval. That is, if each counter starts at 0, is cleared whenever a bit received is not the same as the next bit in the framing pattern sequence (as determined by the count stored thus far), and is incremented whenever a bit received is the same as the next bit in the framing pattern sequence, when that counter reaches a count of $M-1$, and the next bit received is the next bit in the framing pattern sequence, the total framing pattern of M bits will have been received in that bit position. The count can be used as a threshold for determining when framing has occurred. Counts showing less than M framing bits, more than M framing bits, or exactly M framing bits at a position can be used to provide a signal adapted to the probability of the framing pattern occurring within the data stream in an application Starting anywhere in an M-bit framing pattern sequence, if the framing pattern bits are counted until the pattern is about to repeat and the count then reverts to the starting count, the value (0 or 1) of the next bit in the framing pattern sequence can be predicted from the count already stored. For example:

| | | M-Bit Pattern | | M-Bit Pattern | |
|---|---|---|---|---|---|
| Framing Bit | (Next) | 1 0 1 1 0 | 1 | 0 0 1 0 1 1 0 | 1 0 0 |
| Count Stored | | 0 1 2 3 4 | 5 | 6 7 0 1 2 3 4 | 5 6 7 |

The next bit in the pattern, if the count is 4, will be 0 in the sequence shown. In accordance with the present invention, combinational logic is constructed that uses as inputs the previous count, whereby the current bit encountered provides an output signal that is true if the bit value predicted by the count is the same as the bit value encountered.

Methods and apparatus for frame synchronization in accordance with the present invention, have the advantages of being useful, independently of the patterns in which the framing signals being monitored are organized. For example, they are not restricted to the monitoring of frame synchronization patterns organized exclusively as alternations of ones and zeros. Another important advantage of the present invention is that less hardware may be required to perform frame synchronization than required by many of the prior art systems.

The objects, features and advantages of the invention will be better understood from the detailed description of the invention with reference to the attached drawings and tabular material.

In the Text

Table I shows the logic equations that describe the operation of the control circuits and logic function generators in the described embodiment of the present invention when it is operating in the framing mode (searching for frame); and Table II shows the logic equations that describe the operation during the frame monitoring mode when the system is in-frame.

DETAILED DESCRIPTION OF THE INVENTION

In accordance with present practice in digital telephony, data is transmitted in a serial bit stream organized into frames and multiframes. The T1 carrier, for example, transmits at the rate of 1.544 megabits per second. Each frame comprises 24 time slots, each of which comprises 8 bits. Thus, each frame comprises $24 \times 8 = 192$ bits, plus one frame synchronizing bit, making a total of 193 bits per frame.

Figure 1:
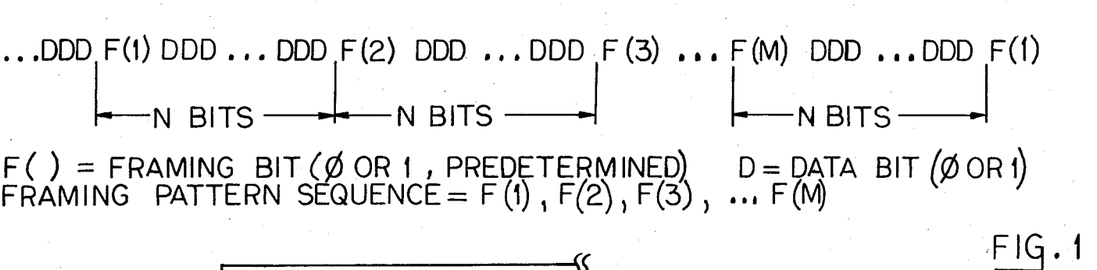
FIG. 1 is a schematic representation of a serial bit stream in which the framing pattern sequence consists of M bits that are distributed as single bits in each frame at intervals of a fixed number, N, of bits.

In addition to the transmitted data, as indicated schematically in FIG. 1, each frame has embedded therein a preselected framing bit for frame synchronization. Taken in sequence, these framing bits, denoted "F" bits, make up the embedded framing pattern. It is necessary to monitor the transmitted carrier to determine where the embedded framing pattern occurs, in order to determine the beginning of each frame.

Figure 2:
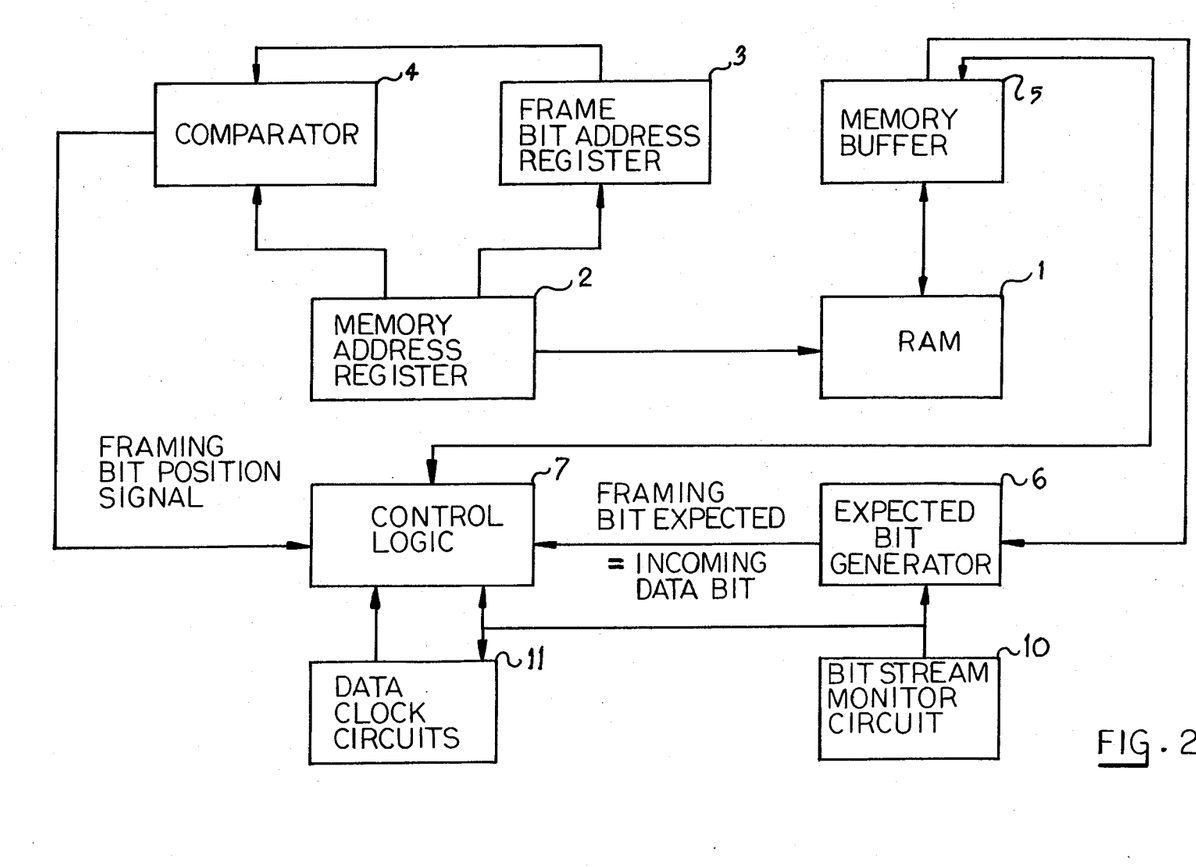
FIG. 2 is a block diagram showing major components for one embodiment of a system in accordance with the present invention.

In accordance with the present invention, an illustrative system, as shown in simplified block diagram in FIG. 2, includes the following circuit elements in combination with a signal source of data in the form of a serial bit stream to be monitored.

The signal data and the synchronizing clock pulses are fed from a conventional input circuit 10, and clock generating circuit 11 into a control logic circuit 7 which functions to direct the sequence of operations of the other circuit elements. They include a random access memory 1 which uses as many memory locations N as there are bit intervals from the start of one bit of framing pattern sequence to the start of the next bit in the framing pattern sequence. For example, in T1 carrier telephony having standard framing, N is equal to 193 memory locations. When the system is configured to monitor a signal that uses the extended framing format, 772 memory locations are used. A memory address register 2 which is connected to sequentially address the locations in the randon access memory 1, includes as many states, N, as there are random access memory locations used.

The memory address register 2 is constructed to advance one state for each clock pulse associated with the incoming signal data of the monitored serial bit stream. When it reaches its last state, at count N, the clock pulse advances the register 2 to its first state. Thus, the memory address register 2, for any bit position in an N-bit interval of the incoming bit stream, points to one memory location. If the state of the memory address register 2 happens to coincide with the occurrence of a framing bit in the distributed framing pattern sequence, because of the equality of the states of the memory address register 2 with the number of bit intervals from the start of one bit forming the framing pattern to the start of the next, the same state of the memory address register 2 will coincide with the next bit of the framing pattern. Thus, the same memory location will be addressed for all occurrences of the framing bit, even though the particular random access memory location involved may not be known.

To determine the state of the memory address register 2 that corresponds to the framing bit position, a count indicating the status of the bit in that bit position of the N-bit interval of the bit stream is stored at the location addressed by the memory address register 2. The count stored at each location of random access memory 1 addressed by the memory addres register 2 is incremented by "one" each time the corresponding bit in the data stream agrees with the expected bit of the framing pattern sequence. The expected bit is determined by the extent to which the framing pattern sequence has been encountered so far at that memory location. The count stored in random access memory 1 is cleared every time a bit is received that is not the next framing bit expected, as determined by the pattern so far received in that bit position. Thus, the agreement of the bit pattern so far received with the actual framing pattern sequence, which is implemented in the logic of the expected bit generator 6, is continually indicated for a given bit position by the count stored at the location addressed by the memory address register 2 for that bit position of the N-bit interval.

Specifically, for a system in which the number, M, of bits in the embedded framing pattern consists, for example, of 12 bits, whenever the pattern sequence for any bit position continues to reflect the framing sequence, a count stored at the bit position's location in the random access memory 1 is incremented by "one". Whenever the monitored incoming framing bit does not agree with the bit expected in accordance with the pre-assigned pattern, the count stored in the random access memory 1, for that bit position, is cleared to zero. When the count stored at any framing bit positin is $M-1$ (11 in the case cited), and the next incoming bit for that bit position has the value of the last bit of the framing pattern sequence, that bit position reveals itself as the framing bit position. The next time that location is addressed indicates not only the start of a frame, but also start of the framing pattern.

The address in the memory address register 2 at which the count in the random access memory 1 reaches the frame-bit-determining count for the embedded bit pattern, is placed in the frame bit address register 3, and whenever the content of the memory address regiater 2 and frame bit address register 3 agree, the start of frame is indicated. The output of a comparator circuit 4, which compares the address in the memory address register 2 with the address in the frame bit address register 3, provides a frame synchronization signal which is directed back to the control logic circuit 7. Any frame's position within the framing pattern is established by the count stored in the location addressed by the frame bit address register 3 whenever the frame synchronization signal occurs.

To achieve the operation described, a memory buffer 5 is loaded with the contents of the location in the random access memory 1 addressed by the memory address register 2, at each clock time of the serial input stream. The count stored at the addressed location provides an input to the expected bit generator 6, where it provides a true output if the framing bit expected equals the data bit being received. Each count corresponds to one bit of the framing pattern sequence. For that count, the next bit in the framing pattern sequence will be zero or one, depending on the pattern. The framing pattern sequence for a particular application is permanently stored or pre-set in the circuitry of the expected bit generator 6. The output of the expected bit generator 6 is true if the bit being received at that bit position of the N-bit interval has the same value as the bit predicted by the count stored for that bit position during the last N-bit interval. If the output of the expected bit generator 6 is false, the memory buffer 5 is cleared. If the output of the expected bit generator 6 is true and the count is less than $M-1$, the memory buffer 5 is incremented. If the output of the expected bit generator is true and the count corresponds to the last bit of the framing pattern sequence ($M-1$), the memory buffer 5 is cleared and a signal that framing has been achieved is sent by the control logic circuitry 7. Then, in the same period of the data clock, the contents of the memory buffer 5 are written into the location of the random access memory addressed by the memory address register 2; and the latter is advanced to its next state.

Figure 3:
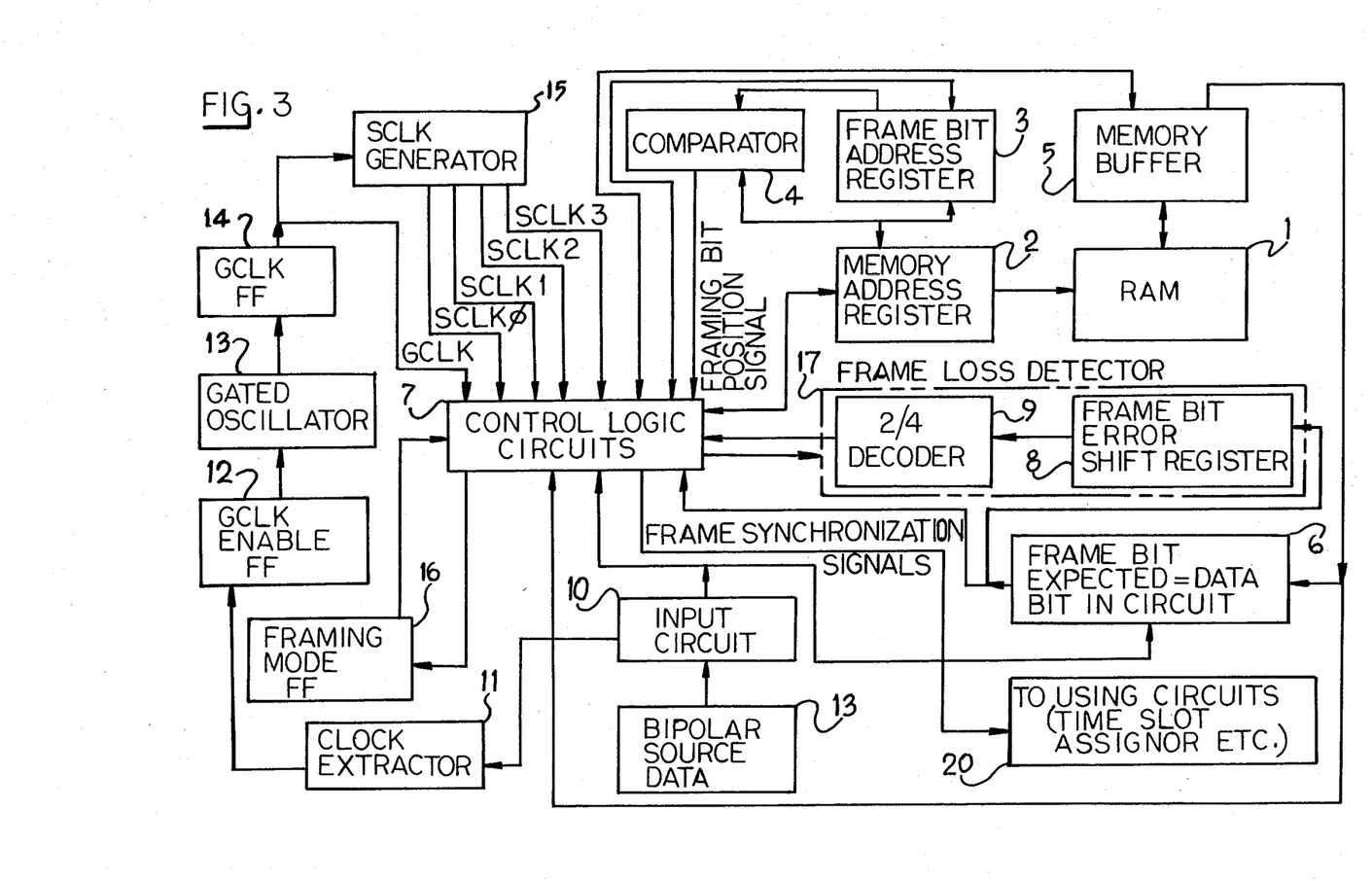
FIG. 3 is a detailed block diagram of one embodiment of a system in accordance with the present invention.

Referring to FIG. 3, a preferred embodiment of the present invention for the T1 carrier with standard framing, includes the following circuit components;

The input circuit, shown as 10 on the block diagram, is transformer coupled to the signal from the carrier source. The input circuit 10 provides a unipolar logic-compatible data signal output from the bipolar digital carrier.

A conventional clock extractor circuit 11 provides a clock signal at the clock rate of the incoming data stream (1.544 Megahertz for the T1 carrier), such that each period of the clock signal corresponds to one bit of the incoming data stream. The negative transition of each clock pulse turns on a gated clock (GCLK) enable flip-flop circuit 12, that, in turn, enables a conventional gated oscillator 13. The latter operates at a frequency of 20 Megahertz, which has a 50 nano second period. The output of oscillator 13 is divided down to 10 Megahertz (100 nano second period) by gated clock (GCLK) flip-flop circuit 14. The gated oscillator 13 is operated at 20 Megahertz because its turn-on delay after enabling is less at the higher frequency. In the embodiment described, the oscillator 13, for example, may take the form of Integrated Circuit Type 74LS628.

Figure 4:
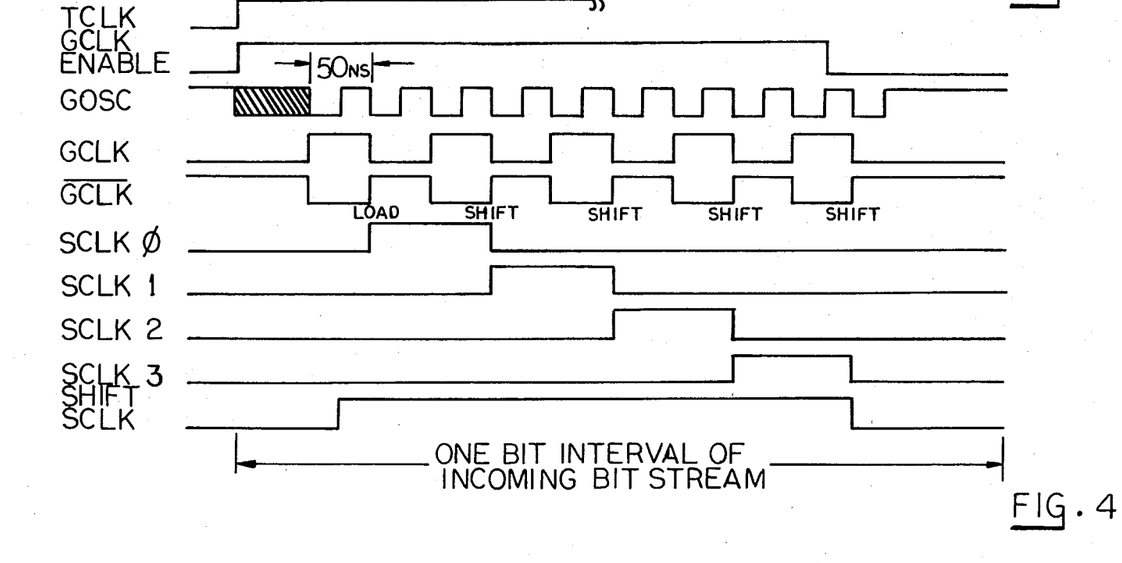
FIG. 4 is a clock timing diagram showing the sequence of timing pulses used in the control of the described embodiment of the present invention.

The output of gated clock (GCLK) flip-flop circuit 14 provides the clock input to the conventional 4-bit shift register 15 which is used to generate sequential gating signals SCLK0, SCLK1, SCLK2, and SCLK3, which are the 100 nano second clocking signals used during each bit interval to control sequential logic operations through the control logic circuit 7. FIG. 4 is a schematic showing the sequence of the clock timing signals for the described embodiment of the present invention.

A particular feature of the frame synchronizing system of the present invention is that initially when the power is turned on, it operates in a framing mode, searching the incoming data stream to locate the onset of each frame. Once the start of the frame has been located, the system is converted to in-frame mode, in which loss of frame is monitored according to some predetermined strategy, whereby upon occurrence of preselected criteria, the system is restored to the framing mode. In the present embodiment, the criterion for restoring the system to framing mode is detection of two out of four successive framing bits in error.

In the present embodiment, the framing flipflop circuit 16, which is connected in circuit relation to the control logic circuit 7, functions to restore the system to the frame monitoring or in-frame mode from the framing mode. Thus, when power is applied, flip-flop circuit 16 is turned on, and the system is searching the incoming signal to establish the framing pattern. Once the pattern has been established, flip-flop circuit 16 is turned off, and the system assumes an inframe mode, monitoring for loss of frame.

The control logic circuit 7, which is shown as a single unit for simplifying discussion, may combine several interconnected circuits, which may comprise, for example, Programmable Array Logic (PAL) integrated circuits, such as types 12L6 and 12H6 manufactured by Monolithic Memories or National Semiconductors. The latter are permanently programmed in accordance with the logic equations set forth in Tables I and II, hereinafter, with the exception of logic equations 9 in each of these Tables, which relate to the programming of expected frame bit error generator 6. The functions symbolized in these equations will be described in detail hereinafter.

The random access memory 1 takes the form of a conventional 256 word by 4 bit memory in which 193 locations are used. This functions to store bit status for each bit in an N-bit interval of the monitored serial bit stream, where N represents the number of bit positions from the start of one framing bit in the framing pattern sequence in the serial bit stream to the start of the next framing bit (193 bits in the case in this embodiment). Each memory location in the random access memory 1, as addressed by memory address register 2, stores a count for the bit position it represents in the N-bit interval. That count represents the number of bits, in the framing pattern sequence thus far encountered at a particular bit position of the N-bit interval. In the present embodiment the number M in the framing pattern sequence is 12. When the count stored in the random access memory indicates that all the bits of the framing pattern sequence have been received, a "synchronization found" signal that turns off the framing mode flip-flop circuit 16 is generated. (In other embodiments this signal may be generated before the total framing pattern has been recognized or after it has been recognized more than once, depending on requirements of speed in recognition or certainty of frame, and the probability of the framing pattern being inherent in the data pattern).

The locations of the random access memory 1 are addressed in sequence by memory address register 2. The latter takes the form, in the present embodiment, of a conventional counter with 193 states which advances to its next state during clock interval SCLK3, and therefore points to a different memory location for each bit position of the 193-bit interval characterizing the serial bit stream monitored in this embodiment.

Figure 5:
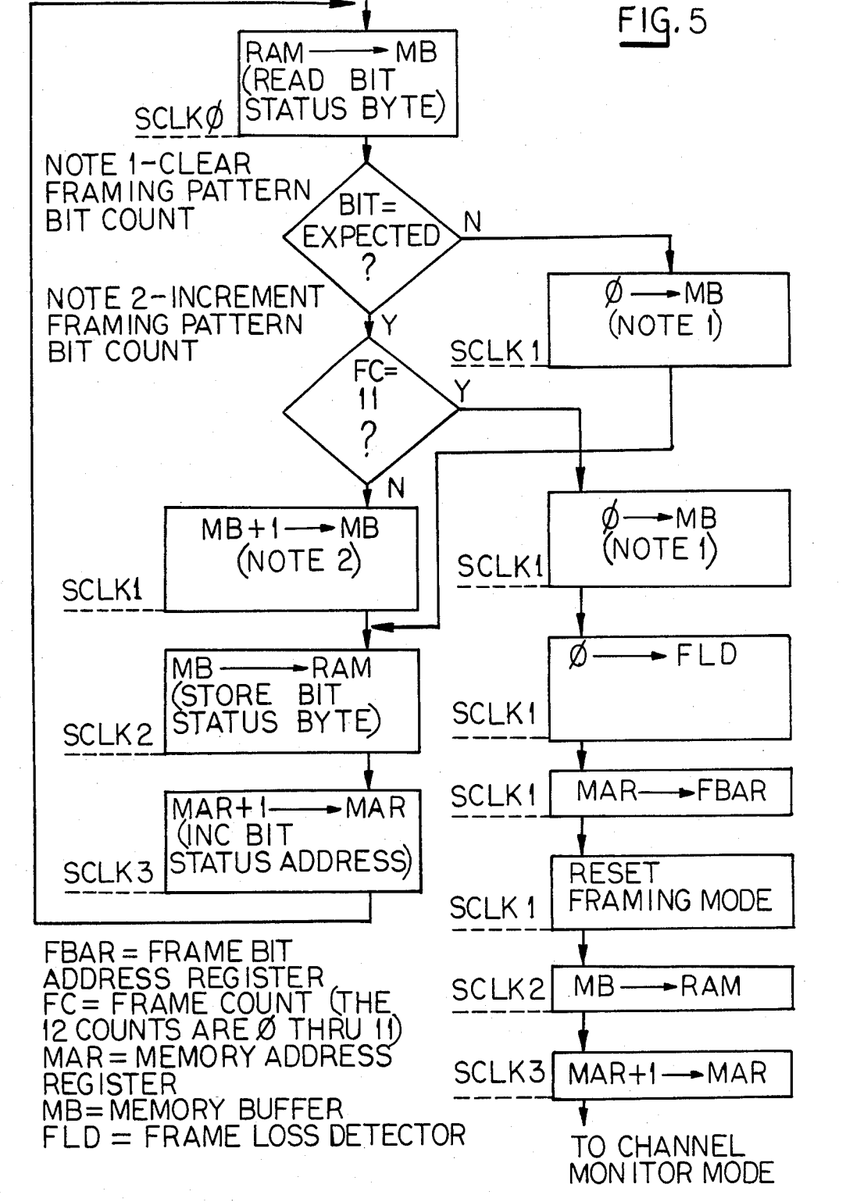
FIG. 5 is a framing mode flow chart showing the operating sequence of logic circuits in the described embodiment of the present invention during the framing mode when frame synchronization is being sought.

The flow chart in FIG. 5 shows the sequence of operations while the system is searching for frame, denoting the framing mode. During clock interval SCLK0, the memory buffer 5 is loaded with the contents of the location addressed by the memory address register 2. The contents of the memory buffer 5 provide input to the expected bit generator 6.

In the embodiment under description, the expected bit generator 6 may comprise an integrated circuit, such as Programmable Array Logic type 16L2, manufactured by Monolithic Memories or National Semiconductor, which is permanently programmed or pre-set to operate in the framing mode, searching for frame as defined in logic equations 9 of Table I, or alternatively to operate in an in-frame mode, as set forth in logic equations 9 of Table II, both of which will be discussed in detail hereinafter.

Returning to the flow chart, FIG. 5, the data bit (0 or 1) in bit position of the N-bit interval corresponding to the location of random access memory 1 addressed by memory address register 2, is also presented to the expected bit generator 6. If the count that was loaded into memory buffer 5 generates a framing bit that is not the same as the data bit being received, as FIG. 5 shows, memory buffer 5 is cleared during clock interval SCLK1. If the contents of memory buffer 5 generate a framing bit that is the same as the bit being received, and the count in memory buffer 5 represents the last bit in the framing pattern sequence, the following operations take place. Memory buffer 5 is cleared; the frame bit error shift register 8 of the frame loss detector 17 is cleared; the content of the memory address register 2 are loaded into the frame bit address register 3, and the framing flip-flop 16 is cleared, all during clock interval SCLK1, establishing the conditions for in-frame operation. In the present embodiment, the conventional error shift register 8, is combined in circuit relation with decoder 9, described hereinafter, to form frame loss detector circuit 17. Frame bit address register 3 may take the form, for example, of Integrated Circuit Type 74LS377, manufactured by Texas Instruments, Inc.

In this embodiment, 12 bits in the T1 carrier framing pattern sequence must be detected before frame synchronization is declared. Therefore, a minimum of 12 frames (1.5 milliseconds) and a maximum of 24 frames (3.0 milliseconds) are required to establish framing. If the contents of memory buffer 5 generate a framing bit that is the same as the bit of the monitored T1 carrier being received, and the count in memory buffer 5 does not represent the last bit in the framing pattern sequence, the count in memory buffer 5 is incremented by 1 during clock interval SCLK1). During clock interval SCLK2, the contents of memory buffer 5 are restored to the memory location addressed by memory address register 2. As noted previously, during clock interval SCLK3, memory address register 2 advances to its next state.

Figure 6:
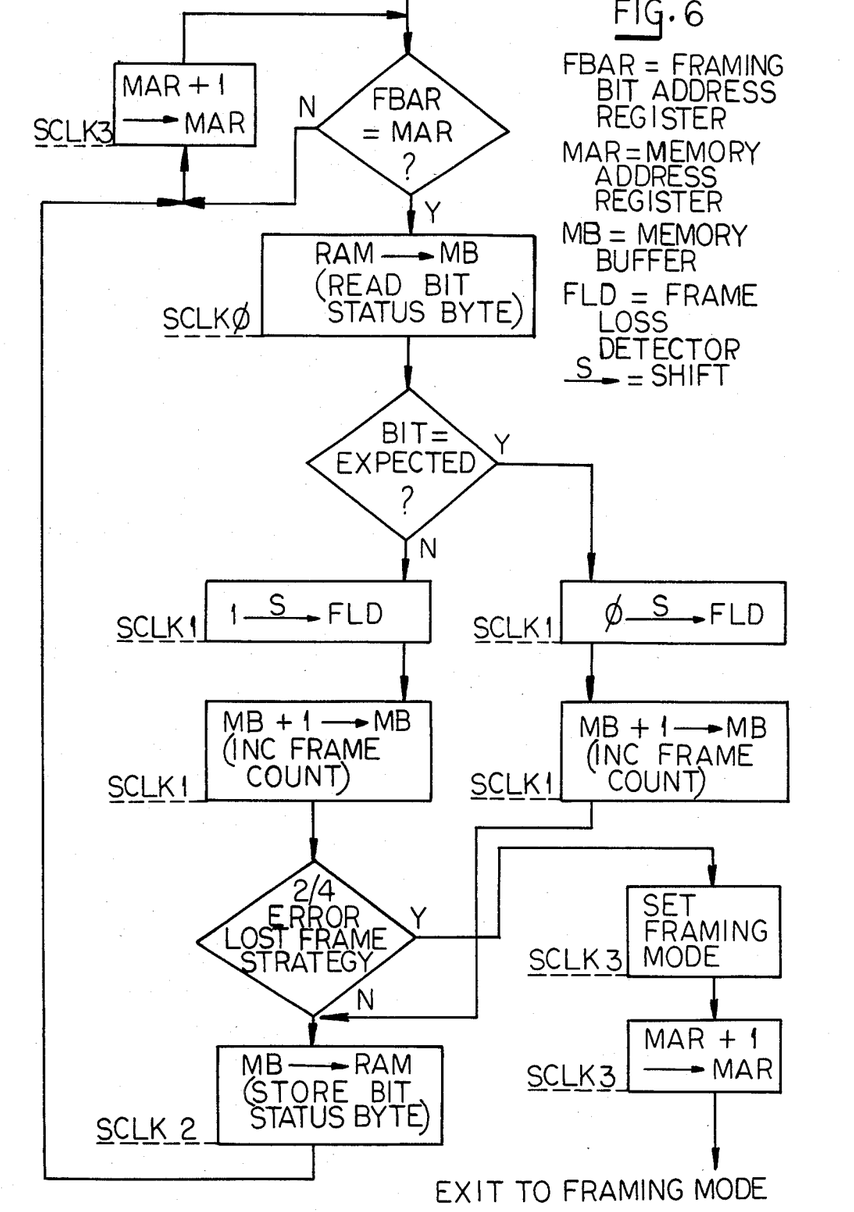
FIG. 6 is a in-frame mode flow chart showing the operating sequence of logic circuits in the described embodiment of the present invention during the frame monitoring mode when the system is in-frame, and loss of frame by a particular strategy is being sought.

FIG. 6 is a flow chart that shows the sequence of operations during the in-frame or monitoring mode, during which the contents of the frame bit address register 3 are compared with the memory address register 2 by comparator 4. Frame bit address register 3 may take the form, for example, of a circuit containing 8 flip-flop circuits with single rail outputs, such as, for example, Integrated Circuit Type 74LS377, manufactured by Texas Instruments, Inc. Comparator circuit 4 may take the form, for example, of an eight-bit, equal-to-comparator, such as Integrated Circuit Type AM25LS2521, manufactured by Advanced Micro Devices.

When the contents of the two registers 2 and 3 agree, the frame bit position is indicated. A pulse out of the comparator 4 is used to signal start of frame to the control logic circuit 7 which sends this signal to other using circuits that, for example, examine the bit in the framing bit position for expected value so that an error count can be maintained and a bit error rate established on an in-service line. These user circuits 20 may take the form of conventional error counting circuits or channel time slot assigned circuits of forms well known in the art.

As previously pointed out, when describing operation in the framing mode, the frame loss detector 17 includes the 4-bit shift register 8, into which a one bit is shifted when the framing bit received does not agree with the bit expected, that is, when the output of the expected bit generator 6 is false. In this embodiment, when operating in the in-frame monitoring mode, whenever 2 out of 4 of the bits in 17 are "one", the framing flip-flop circuit 16 is set, returning the system to its framing mode, and a search for frame is begun.

TABLE I
LOGIC EQUATIONS
FRAMING MODE

1. LOAD MB = SCLK$\emptyset$ · GCLK
2. INC MB = FBE · $\overline{FC11}$ · SCLK1 · GCLK
3. CLR MB = ($\overline{FBE}$ + FC11) · SCLK1 · GCLK
4. CLR FBESR = FC11 · FBE · SCLK1
5. LOAD FBAR = FC11 · FBE · SCLK1 · GCLK
6. RESET FM = FC11 · FBE · SCLK1 · GCLK
7. WRITE RAM = SCLK2
8. INC MAR = SCLK3 · GCLK
9. FBE = DATA ($\overline{B1}$ · $\overline{B2}$ + B1 · $\overline{B3}$ · $\overline{B4}$ + $\overline{B2}$ · $\overline{B4}$) + $\overline{DATA}$ (B1 · $\overline{B3}$ · B4 + $\overline{B1}$ · B2 · $\overline{B3}$ + B2 · B3)
(See note below)
10. CLR MAR = MAR6 · MAR7 · SCLK3 · GCLK
11. FC11 = B1 · B2 · B4

FM = FRAMING MODE
MB = MEMORY BUFFER
MAR = MEMORY ADDRESS REGISTER
MARX = MEMORY ADDRESS REGISTER BIT (X = DIGIT 0 THRU 7, LSB TO MSB)
FBESR = FRAMING BIT ERROR SHIFT REGISTER
FBAR = FRAMING BIT ADDRESS REGISTER
FBE = FRAMING BIT EXPECTED EQUALS DATA BIT RECEIVED
FC11 = FRAME COUNT IS 11 IN THE MB. (THE 12 COUNTS (STATES) IN THIS IMPLEMENTATION ARE $\emptyset$ THRU 11)
B1, B2, B3, B4 = MB OUTPUT, LSB TO MSB (FRAMING PATTERN BIT COUNT)
DATA = 1 WHEN INCOMING BIT FROM DATA STREAM IS 1.
DATA = $\emptyset$ WHEN INCOMING BIT FROM DATA STREAM IS $\emptyset$.
Note: Equation reflects zero count in 5th position of framing pattern sequence 100011011100. Position of zero count is arbitrary except that the bits in the framing pattern sequence preceding the zero count bit position must not result in non-zero count at the chosen starting location when the counter algorithm in this implementation is used.

Table I shows logic equations detailing operation of the system for the framing mode for the embodiment described hereinbefore. The embodiment reflects T1 carrier in standard framing format with both terminal framing bits and signaling framing bits counted as part of the framing pattern sequence. (In the T1 carrier framing format most commonly used, terminal framing bits and signaling framing bits occur alternately in the framing pattern sequence, there being six of each. The former are adequate to establish start of frame. The latter are needed to establish frame position.) In the present illustration, M, the total number of bits in the framing format is equal to 12.

Equation 1 shows that the memory buffer 5 in FIG. 3 is loaded from the random access memory 1 during clock interval SCLK0 for each incoming-bit interval. It will be loaded with the contents of the location pointed to by the memory address register 2 in FIG. 3 during that bit interval.

Equation 2 shows that the contents of memory buffer 5 will be incremented during clock interval SLCLK1 for each incoming-bit interval if a count of 11 has not been reached and the framing bit expected equals the data bit received from the serial bit stream. The 12 counts (states of the memory buffer 5) stored for this embodiment are 0 through 11.

Equation 3 shows that the memory buffer 5 will be cleared during clock interval SCLK1 for each incoming bit interval if the framing bit expected does not equal the data bit received, or if a count of 11 has been reached.

Equation 4 shows that the framing bit error shift register 8 in FIG. 3, which is part of the frame loss detector 17, is cleared during clock interval SCLK1 whenever the count reaches 11 and the framing bit expected equals the data bit received from the serial bit stream.

Equation 5 shows that the framing bit address register 3 in FIG. 3, is loaded from the memory address register 2 during clock interval SCLK1 when the count reaches 11 and the framing bit expected equals the data bit received from the serial bit stream.

Equation 6 shows that the framing mode flip-flop circuit 16, in FIG. 3, is cleared during clock interval SCLK1 when the counts reaches 11 and the framing bit expected equals the data bit received from the serial bit stream.

Equation 7 shows that the contents of the memory buffer 5, in FIG. 3, are written into random access memory 1 at the location indicated by the memory address register 2 during clock interval SCLK2 for each incoming-bit interval.

Equation 8 shows that the memory address register 2 is incremented during clock interval SCLK3 for each incoming bit-interval.

Equation 9 shows the conditions for which framing bit expected equals data bit received. The expected bit is predicted from count in memory buffer, on B1 through B4. The actual bit received is the data signal derived from the serial bit stream.

Equation 10 shows that the memory address register 2, in FIG. 3, is cleared during clock interval SCLK3 whenever it is in its 192nd state. It therefore assumes 193 states, 0 through 192.

Equation 11 shows that the count of 11 occurs when B1, B2, and B4 bits of the memory buffer 5 are all 1, and their values are added in binary fashion.

TABLE II

LOGIC EQUATIONS
IN-FRAME MODE

1. LOAD MB = (MAR = FBAR) · SCLK0 · GCLK
2. INC MB = (MAR = FBAR) · SCLK1 · GCLK
3. CLR MB = FC11 + $\overline{FBE}$ · $\overline{(MAR = FBAR)}$ · SCLK1 · GCLK
4. SHIFT FBESR = (MAR = FBAR) · SCLK1 · GCLK
5. SET FM = (MAR = FBAR) · 2/4FE · SCLK3 · GCLK
6. WRITE RAM = SCLK2
7. INC MAR = SCLK3 · GCLK
8. CLR MAR = MAR6 · MAR7 · SCLK3 · GCLK
9. 2/4FE = FEA · FEB + FEA · FEC + FEA · FED + FEB · FEC + FEB · FED + FEC · FED FM = FRAMING MODE
MB = MEMORY BUFFER
MAR = MEMORY ADDRESS REGISTER
MARX = MEMORY ADDRESS REGISTER BIT (X = DIGIT 0 THRU 7, LSB TO MSB)
FBESR = FRAME BIT ERROR SHIFT REGISTER
FBAR = FRAME BIT ADDRESS REGISTER
FM = FRAME MODE
2/4FE = 2 OUT OF 4 FRAME BITS IN ERROR
FEA, FEB, FEC, FED = FRAME BIT ERROR SHIFT REGISTER BIT A, BIT B, BIT C, BIT D, LSB TO MSB Table II shows logic equations for the inframe mode for the embodiment described above.

Equations 1 and 2 show that the memory buffer 5 is loaded and incremented only during the bit interval when the contents of the memory address register 2, in FIG. 3, equal the contents of the frame bit address register 3 in FIG. 3, indicating that the framing bit position of the N-bit interval has occurred.

Equation 3 shows that the memory buffer is cleared when a count of 11 is reached or it is not the framing bit position and the bit received is not the bit expected.

Equation 4 shows that the framing bit error shift register 8, in FIG. 3, which is a portion of the frame loss detector 17, in FIG. 3, is shifted during clock interval SCLK1 whenever the framing bit position of the N-bit interval occurs. The data shifted into framing bit error shift register 8 is provided by the logic negative of the framing bit expected when the latter equals data bit received signal (equation 9 in Table I). Thus, the value of the input to shift register 8 will be 0 when the framing bit expected equals the data bit received; and 1 otherwise, so that a 1 will be shifted into the framing bit error shift register 8 each time the wrong framing bit occurs during in-frame operation.

Equation 5 shows that the framing mode flip-flop circuit 16 will be set during clock interval SCLK3, causing the system to revert to the framing mode, commencing a framing search, if during the framing bit position of the N-bit interval two out of four successive framing bits were in error.

Equations 6, 7, and 8 of Table II are identical to equations 7, 8, and 10, respectively, in Table I.

Equation 9 shows the output decoder logic circuit 9, in FIG. 3, for the framing bit error shift register 8. The output of the decoder 9 will be true when 2 out of 4 of the stages of the framing bit error shift register 8 contain 1's.

It will be understood that the invention is not limited to the specific systems or components thereof described herein by way of example, but only by the scope of the appended claims.

What is claimed is:

1. The method of frame bit synchronization in a framing mode searching for a framing pattern sequence embedded in a serial bit stream, said framing pattern sequence consisting of M bits distributed as single bits at intervals denoting a frame having a fixed number N, of bits, where N is the number of bits from the start of one framing bit in said serial bit stream to the start of the next, constituting a frame, comprising the steps of:

continually deriving a clock signal from the serial bit stream;

during each clock interval, advancing one bit position in an N-bit interval, and going to the first bit position of the interval after the last bit position of the interval;

temporarily storing a count for each bit position of the N-bit interval, said count representing the number of bits in the M-bit framing pattern sequence thus far sequentially encountered at that bit position of the N-bit interval, using said count at each bit position of the N-bit interval to predict the value (zero or one) of the next incoming bit at that bit position, presuming it is the bit for (said count+1) in the M-bit framing pattern sequence;

determining that a given bit position in the N-bit interval is the framing bit position when the count at said given position reaches a particular preselected value V, which is a value which may be chosen to be other than M;

storing an indication that the framing pattern has been discovered; and storing the position corresponding to count V in said N-bit interval at which the framing pattern was discovered so that when stepping through the interval, a signal can be obtained whenever a position encountered is the same as the position stored indicating that the framing bit position has occurred.

2. In a system in which the framing pattern has been discovered, and a count V indicating the position of said framing pattern has been stored in a framing mode searching for frame in accordance with claim 1, the method of frame loss determination, when in-frame, for a framing pattern sequence embedded in a serial bit stream and consisting of M bits distributed as single bits at intervals of N-bits, where N is the number of bits from the start of one framing bit in said serial bit stream to the start of the next;

continually deriving said serial bit stream from its source;

continually deriving a clock signal from the serial bit stream;

during each clock interval advancing one bit position in an N-bit interval, and going to the first bit position of the interval after the last bit position of the interval;

obtaining a signal whenever the bit position encountered in the N-bit interval is the same as the bit position stored when the framing bit position was discovered during the search-for-frame operation in accordance with claim 1, thus indicating that the framing bit position of the N-bit interval has occurred;

saving a count V, at the last named framing bit position that indicates which bit position of the M-bit framing pattern sequence is the next that will be encountered;

using said count V at said last-named framing bit position of the N-bit interval to predict the value (zero or one) of the next incoming bit at the framing bit position, presuming it is the bit for (count+1) in the M-bit framing pattern sequence;

saving the value 0 when the value of the framing bit received is the same as the value of the framing bit predicted and saving the value 1 when the value of the framing bit received differs from the value of the framing bit predicted;

declaring loss of frame when a preselected number of bits out of the number of bits saved have the value 1; and storing an indication that frame search is to begin in accordance with the steps set forth in claim 1.

3. A system for obtaining and maintaining synchronization for a serial bit stream from a source of data comprising a serial bit stream organized in frames each having N bits, each frame including a frame-synchronizing signal, a frame synchronizing pattern for a consecutive group of said frames being formed of a preselected assigned pattern comprising a fixed number of M bits of said frame synchronizing signals distributed over a fixed clock interval, which system comprises in circuit combination:

an input circuit constructed upon energization to continually receive said serial bit stream from said source;

a clock generator constructed to produce clock signals synchronized with the repetitive rate of said serial bit stream;

a control logic circuit in energy transfer relation with said input circuit and said clock signal generator; and constructed and arranged to control the operation and timing of each of said follwing circuit elements:

a random access memory circuit having N stations corresponding to the number of bits in each frame;

a memory address register having N states and constructed to be advanced one state for each clock signal of said clock interval, and when it reaches the Nth said state, to revert to its first state, said memory address register constructed to address the stations of said random access memory in sequence;

a memory buffer coupled to said random access memory, said memory buffer constructed and arranged to receive and store the contents of said random access memory at each clock signal addressed by said memory address register;

an expected bit generator having a pre-set program to reflect the preselected assigned pattern of M bits in said framing pattern, and coupled to said memory buffer to receive the count therefrom at each clock signal corresponding to the clock signal at each state of advancement of said memory address register, and to compare the bit stream signal received at said given clock signal from said memory buffer with the corresponding bit of said preselected assigned pattern wherein if said bits agree, a corresponding position in said memory buffer is incremented, and wherein if said bits do not agree, the count stored in said memory buffer is cleared to zero;

said memory buffer constructed at each corresponding clock signal, to write the contents stored therein into the location in said random access memory addressed by said memory address register, wherein, whenever at each memory location in said random access memory addressed by said memory address register the pattern sequence of the bit in said location agrees with said preselected assigned pattern, the count stored in said random access memory is incremented by one, and wherein whenever the pattern sequence of the bit in said location disagrees with said preselected assigned pattern, the count stored in said random access memory is cleared to zero, and wherein, when the count stored in said random access memory reaches a preselected count V which may be chosen to be other than M, and the next bit received is the pre-assigned value for that count, the framing bit position is revealed, and means is actuated to send a "synchronization found38 signal to said control logic circuit to convert operation of said circuit to an in-frame monitoring mode;

a frame bit address register connected in circuit relation with said memory buffer, said memory buffer constructed and arranged whenever the count stored in said random access memory reaches said preselected count V, and the next bit received is the pre-assigned value for that count, to transfer the address stored in said memory address register to said frame bit address register; and a comparator constructed and arranged in response to continual receipt by said control logic circuit of said serial bit stream from said source to sequentially receive and compare the addresses from said frame bit address register and memory address register, and whenever the said addresses agree, to indicate the start of a frame.

4. A frame-bit synchronizer constructed to operate in a framing mode searching for a framing pattern sequence in a serial bit stream consisting of M framing bits distributed as single bits at intervals of a fixed number, N, of bits, where N is the number of bits from the start of one framing bit in the serial bit stream to the start of the next, comprising in combination:
  a source of said serial bit stream;
  a generator of clock signals synchronized with the repetition of rate of said serial bit stream;
  a random access memory with exactly N locations used, each position corresponding to one position in the N bit interval;
  an N state memory address register connected, upon receipt of a clock signal from said clock signal generator, to address each of the N locations of said random access memory sequentially and to change the state thereof to produce a count with each bit received from said source, wherein said memory address register always points to the same location in said random access memory during the corresponding clock interval of said framing bit;
  an expected bit generator having said framing pattern sequence pre-set in its circuitry;
  a memory buffer constructed and arranged in accordance with each bit location in said N bit interval, to be cleared whenever the bit received is not the same as the bit expected from said expected bit generator corresponding to the framing pattern sequence so far detected at that bit position as determined by the count stored in said random access memory, and to be incremented whenever the incoming bit received is the same as the bit expected according to said framing pattern sequence;
  combination circuit means coupled to said random access memory and including said source of said serial bit stream constructed and arranged to accept as input the contents of the currently-addressed memory location of said random access memory and the value (0 or 1) of the incoming serial bit stream to provide an output signal to said memory buffer that indicates whether its contents should be cleared or incremented; and
  means comprising a frame declaration circuit responsive to a preselected application-dependent count V in said memory buffer, which may be chosen to be other than M, for confirming that a preselected framing criterion has been met and that true frame has been discovered in the serial bit stream.

5. In a frame bit synchronizer in accordance with claim 4, comprising a circuit for frame loss detection after frame has been declared by said frame declaration circuit after reaching a preselected count V, in said frame bit synchronizer, which comprises in combination:
  a frame bit address register connected in circuit relation with said memory buffer and said memory addres register, said memory buffer constructed and arranged whenever the count stored in said random access memory reaches said preselected count V, and frame is declared, to transfer the address stored in said memory addres register to said frame bit address register;
  a comparator in circuit relation with said frame bit address register and said memory addres register, and continuously responsive to receipt of the serial bit stream from said source to sequentially receive and compare the addresses from said frame bit address register and said memory address register, and to produce a frame bit position signal (0 or 1) that respectively indicates whether or not the framing bit position in the serial bit stream derived from said source conforms to the framing bit at that position stored in said frame bit address register; and
  means comprising a frame bit error shift register, responsive to said frame bit position signal, into which the value 0 or 1 is shifted on each occurrence of said framing bit position signal, denoting a correct value or error in the framing pattern sequence at that time; and
  means comprising a monitor circuit for monitoring the output of said frame bit error shift register which is constructed to provide a frame loss signal whenever a preselected number of errors is recorded.

* * * * *